US009692975B2

(12) United States Patent
Liu

(10) Patent No.: US 9,692,975 B2
(45) Date of Patent: Jun. 27, 2017

(54) MOTION BLUR-FREE CAPTURE OF LOW LIGHT HIGH DYNAMIC RANGE IMAGES

(71) Applicant: Microsoft Technology Licensing, LLC, Redmond, WA (US)

(72) Inventor: Xinqiao Liu, Medina, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 84 days.

(21) Appl. No.: 13/860,112

(22) Filed: Apr. 10, 2013

(65) Prior Publication Data
US 2014/0307110 A1    Oct. 16, 2014

(51) Int. Cl.
H04N 5/228    (2006.01)
H04N 5/232    (2006.01)

(52) U.S. Cl.
CPC ..... H04N 5/23267 (2013.01); H04N 5/23258 (2013.01); H04N 5/23277 (2013.01)

(58) Field of Classification Search
CPC .......................... H04N 5/232; H04N 5/23248
USPC ....................................................... 348/208.6
See application file for complete search history.

(56) References Cited

U.S. PATENT DOCUMENTS

| 7,061,524 | B2 | 6/2006 | Liu et al. | |
|---|---|---|---|---|
| 7,916,177 | B2 | 3/2011 | Motomura et al. | |
| 2005/0168582 | A1* | 8/2005 | Stuckler | 348/208.2 |
| 2007/0132771 | A1* | 6/2007 | Peer et al. | 345/545 |
| 2007/0133092 | A1 | 6/2007 | Maeda et al. | |
| 2007/0242900 | A1* | 10/2007 | Chen | G06T 5/50 |
| | | | | 382/294 |
| 2010/0119171 | A1 | 5/2010 | Gobert | |
| 2010/0220222 | A1 | 9/2010 | Naito | |
| 2010/0265370 | A1 | 10/2010 | Kumar et al. | |
| 2011/0096179 | A1* | 4/2011 | Border et al. | 348/208.4 |

(Continued)

FOREIGN PATENT DOCUMENTS

EP    1501288 A2    1/2005

OTHER PUBLICATIONS

Safaee-Rad, et al., "Handshake Characterization and Image Stabilization for Cell-Phone Cameras", Retrieved at <<http://144.206.159.178/ft/CONF/16427600/16427624.pdf>>, In Color Imaging XIV: Displaying, Processing, Hardcopy, and Applications, 72410V, Jan. 1, 2009, pp. 15.

(Continued)

Primary Examiner — Stephen Coleman

(57) ABSTRACT

Embodiments of the disclosure compensate for global movement and in-scene movement during image capture by a computing device. A sequence of images is accessed by the computing device. Accelerometer readings and/or gyroscope readings corresponding to each of the accessed images are used by the computing device for calculating global movement among each of the accessed images. Each of the accessed images is re-aligned based on the calculated global movement. The re-aligned images are combined into a single output image. The intensity values of each of the pixels in the re-aligned images are compared with the intensity values of each of the corresponding pixels in a reference image. Based on the comparison, the intensity values associated with the pixels in the re-aligned images are selectively accumulated to generate an output image that is blur-free, low-light enhanced, and high dynamic range.

20 Claims, 11 Drawing Sheets

(56) References Cited

U.S. PATENT DOCUMENTS

| | | | |
|---|---|---|---|
| 2011/0122266 A1* | 5/2011 | Jang | H04N 5/23248 348/208.6 |
| 2011/0133933 A1* | 6/2011 | Davis et al. | 340/571 |
| 2012/0065926 A1* | 3/2012 | Lee | G06F 3/0346 702/141 |
| 2012/0069203 A1 | 3/2012 | Voss et al. | |
| 2012/0070100 A1 | 3/2012 | Naito | |
| 2012/0086829 A1 | 4/2012 | Hohjoh | |
| 2013/0329072 A1* | 12/2013 | Zhou | G06T 3/4038 348/222.1 |

OTHER PUBLICATIONS

Choi, et al., "Motion-Blur-Free Camera System Splitting Exposure Time", Retrieved at <<http://ieeexplore.ieee.org/stamp/stamp.jsp?tp=&arnumber=4637576>>, IEEE Transactions on Consumer Electronics, Aug. 2008, pp. 6.

Tico, et al., "Motion-Blur-Free Exposure Fusion", Retrieved at <<http://research.nokia.com/files/public/MariusTico_ICIP2010.pdf>>, In International Conference on Image Processing, Sep. 26, 2010, pp. 4.

"PureView technology and PureMotion HD+ display on the Nokia Lumia 920", Retrieved at <<http://www.nokia.com/global/products/pureview/>>, Retrieved Date: Nov. 26, 2012, pp. 8.

Sanketi, et al., "Anti-Blur Feedback for Visually Impaired Users of Smartphone Cameras", Retrieved at http://www.ski.org/Rehab/Coughlan_lab/General/Publications/1070o-sanketi.pdf>>, 12th International ACM SIGACCESS Conference on Computers and Accessibility, Oct. 25, 2010, pp. 2.

Sachs, et al., "Image Stabilization Technology Overview", Retrieved at <<http://www.invensense.com/mems/gyro/documents/whitepapers/ImageStabilizationWhitepaper_051606.pdf, Retrieved Date: Dec. 18, 2012, pp. 18.

"International Search Report & Written Opinion for PCT Patent Application No. PCT/US2014/033239", Mailed Date: Jun. 17, 2014, Filed Date: Apr. 8, 2014, 10 Pages.

* cited by examiner

MOTION BLUR-FREE CAPTURE OF LOW LIGHT HIGH DYNAMIC RANGE IMAGES

BACKGROUND

The quality of images captured by mobile devices, such as mobile telephones, continues to improve. However, due in part to the small form factor of some of these mobile devices, image blur caused by hand motion and/or object motion remains a challenge. Further, as the mobile devices become used more frequently in low light conditions, the cameras in the mobile devices often do not have exposure times long enough to compensate for the lack of light. In addition, the dynamic range of the cameras in the mobile devices is limited due to the shrinking pixel size in the image sensors. As a result, the quality of images captured by the mobile device may be less than desired.

Some existing systems use optical image stabilization (OIS) to compensate for movement. In such systems, the camera lens or the image sensor is shifted to compensate for camera movement during the exposure time. The camera lens or image sensor is mechanically driven by actuators such as voice coil motor or micro-electro-mechanical systems (MEMS) built inside the compact camera module. Existing OIS systems are expensive, consume high power, and increase the size of the camera module in the mobile devices. In such systems, the mobile devices consume precious battery power and become bulky. Further, the existing OIS systems attempts to compensate only for motion blur caused by handshake, but not for motion blur caused by in-scene subject motion. Additionally, the existing solutions do not address pixel saturation in high light portions of the images.

SUMMARY

Embodiments of the disclosure access images captured by a computing device. Readings from an accelerometer and/or gyroscope associated with the computing device are accessed. Each of the readings corresponds to at least one of the accessed images. Global movement among each of the accessed images based on the accessed readings is calculated. Each of the accessed images is re-aligned based on the calculated global movement. The re-aligned accessed images are combined into a single output image.

Alternatively or in addition, a first image and a second image from a sequence of images captured by a computing device are accessed. Intensity values associated with pixels in the first image are compared to intensity values associated with corresponding pixels in the second image. The intensity values associated with the pixels in the first image are selectively accumulated with the intensity values associated with the corresponding pixels in the second image based on the comparison, thus producing cumulative intensity values. An output image is generated from the cumulative intensity values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
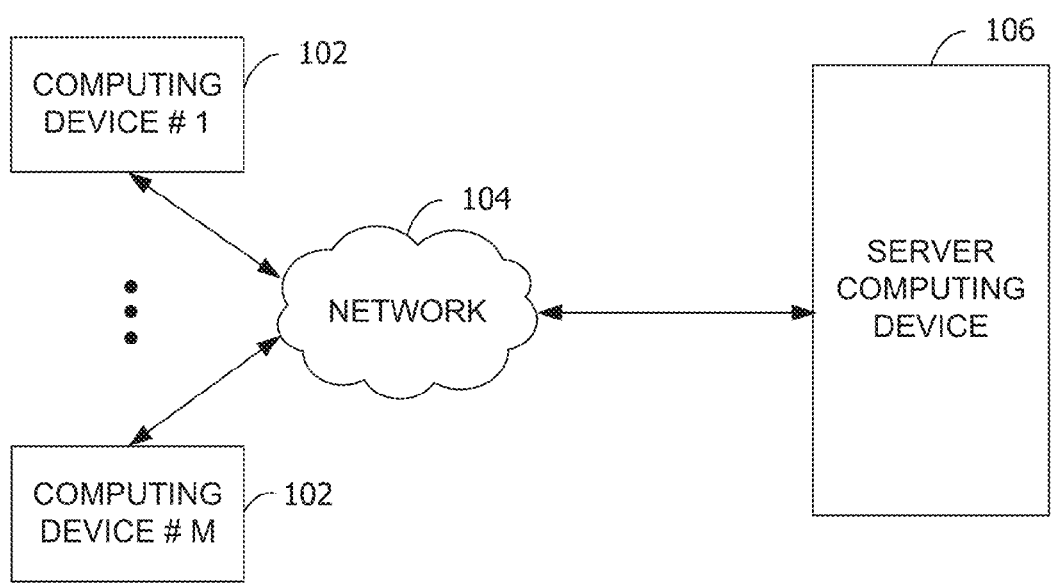
FIG. 1 is an exemplary block diagram illustrating a cloud-based system including a server computing device communicating with a plurality of computing devices.

Referring to the figures, embodiments of the disclosure compensate for global motion and/or in-scene motion when capturing images 214. In some embodiments, a burst of frames is captured by a computing device 102. The burst of frames represents a sequence of images 214 captured at a defined rate (e.g., frames-per-second). Accelerometer readings 216 and/or gyroscope readings 218 are captured with the frames (e.g., contemporaneously). The computing device 102, or other processing entity, calculates global movement among the captured frames using the accelerometer readings 216 and/or the gyroscope readings 218. Each of the frames is re-aligned based on the calculated global movement. After re-alignment of the frames, the intensity values associated with the pixels in the re-aligned frames are compared with expected intensity values derived from a reference frame. Based on the comparison, the intensity values associated with the pixels in the re-aligned frames are selectively accumulated, and an output image is generated from the selectively accumulated intensity values.

Aspects of the disclosure thus compensate for both global movement and in-scene subject movement while capturing the frames. Further, the selective accumulation of intensity values associated with the pixels in the re-aligned frames prevents saturation during frame capture. In this manner, embodiments of the disclosure provide a low cost, low power and robust solution without operating any mechanical or moving parts (e.g., in contrast to optical image stabilization) residing with an image sensor 206 in a camera module of the computing device 102. As such, aspects of the disclosure compensate for both global motion and in-scene motion while preventing saturation during image capture, without increasing a size of the camera module.

Aspects of the disclosure further improve the quality of images 214 taken by mobile devices (e.g., mobile telephones) under low light conditions without motion blur artifacts (or with reduced motion blur artifacts), resulting in improved signal-to-noise ratios (SNRs) relative to optical image stabilization (OIS) systems. By selectively accumulating the intensity values for each pixel across the burst of images 214 as described herein, the dynamic range of the image sensor 206 is increased because each pixel is able to operate at a higher light level. For example, the dynamic range is increased by N times where N is the total number of frames. By extending the dynamic range of the camera module, the image sensor 206 is prevented from saturating under high illumination. In contrast, the effective exposure time of the output image is longer than a conventional image sensor can handle.

While some aspects of the disclosure are described as compensating for both global motion and in-scene motion, it is contemplated that some embodiments compensate for global motion or in-scene motion. Further, while the operations illustrated and described herein may be executed by the computing device 102 (e.g., a camera, a mobile telephone, a tablet, etc.) as a stand-alone device, some cloud-based embodiments contemplate execution of the operations by a server computing device 106 communicating with one or more of the computing devices 102, as next described with reference to FIG. 1.

Referring to FIG. 1, an exemplary block diagram illustrates a cloud-based system including the server computing device 106 communicating with a plurality of the computing devices 102. In the example of FIG. 1, the computing devices 102, such as computing device #1 through computing device #N, communicate with the server computing device 106 via a network 104. The computing device 102 represents any device executing instructions (e.g., as application programs, operating system functionality, or both) to implement the operations and functionality described herein. The computing device 102 may include a mobile computing device 102 or any other portable device. In some embodiments, the mobile computing device 102 includes a mobile/cellular telephone, camera, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

The network 104 may include a wired and/or a wireless network. The network 104 may also be implemented using any type of network topology and/or communication protocol, may be represented or otherwise implemented as a combination of two or more networks, and may include Internet Protocol (IP) networks and/or the Internet. The network 104 may also include mobile operator networks that are managed by a mobile network operator and/or other network operators, such as a communication service provider, mobile phone provider, and/or Internet service provider.

In operation, the functionality described herein may be performed by each of the computing devices 102 and/or the server computing device 106. For example, each of the computing devices 102 may perform image processing on a sequence of the images 214 captured by that computing device 102. In another example, one of the computing devices 102 sends (e.g., in real-time, periodically, intermittently, as a batch, etc.) a captured sequence of the images 214 to the server computing device 106, along with the corresponding accelerometer readings 216 and/or gyroscope readings 218. The server computing device 106 performs the image processing and returns the output image to the computing device 102 for display.

Figure 2:
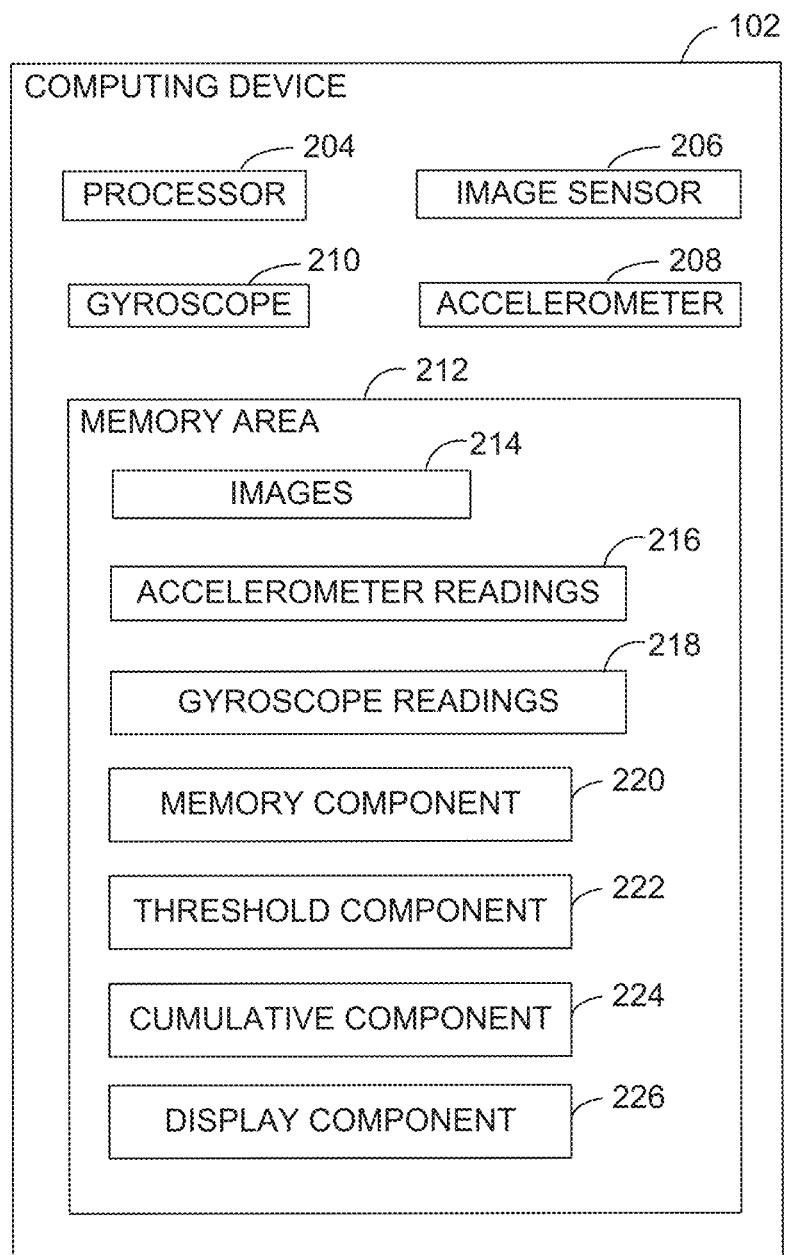
FIG. 2 is an exemplary block diagram illustrating a computing device with executable components.

Referring next to FIG. 2, an exemplary block diagram illustrates an architecture of the computing device 102. In the example of FIG. 2, the computing device 102 includes at least one image sensor 206, at least one gyroscope 210, at least one accelerometer 208, at least one processor 204, and at least one memory area 212. The image sensor 206 may be any type of analog sensor, digital sensor such as a charge-coupled device (CCD) or complementary metal-oxide-semiconductor (CMOS), or the like. Other type of image sensors 206 known in the art may be used in the computing device 102 for capturing a sequence of images 214.

The accelerometer 208 operates to capture the movement of the computing device 102, such as while capturing a sequence of images 214 (e.g., frames). For example, the accelerometer 208 provides data representing the movement of the computing device 102. Single-axis accelerometers, multi-axis accelerometers, micro-machined accelerometers, and other accelerometers are within the scope of the present disclosure.

The gyroscope 210 operates to capture the rotational movement of the computing device 102 while capturing the sequence of images 214. For example, the gyroscope 210 provides data representing the rotational movement of the computing device 102. Mechanical, electronic, microchip-packaged micro-electro-mechanical systems (MEMS), solid-state ring laser, fiber optic, quantum gyroscope, and other gyroscopes are within scope of the present disclosure.

In some embodiments, the accelerometer readings 216 and/or the gyroscope readings 218 are captured at approximately, substantially, or otherwise about the same time images 214 are captured by the computing device 102. For example, the accelerometer readings 216 and/or the gyroscope readings 218 are obtained simultaneously with the capture of each image 214. In some embodiments, the images 214 and accelerometer readings 216 (and/or gyroscope readings 218) are synchronized, correlated, or otherwise associated with each other via a time stamp associated with each of the images 214 and in each of the readings 216, 218. That is, the time stamp is generated and stored upon capture of each image 214 and upon obtaining each of the readings 216, 218.

The processor 204 includes any quantity of processing units, and is programmed to execute computer-executable instructions for implementing aspects of the disclosure. The instructions may be performed by the processor 204 or by multiple processors executing within the computing device 102, or performed by a processor external to the computing device 102 (not shown).

Figure 3:
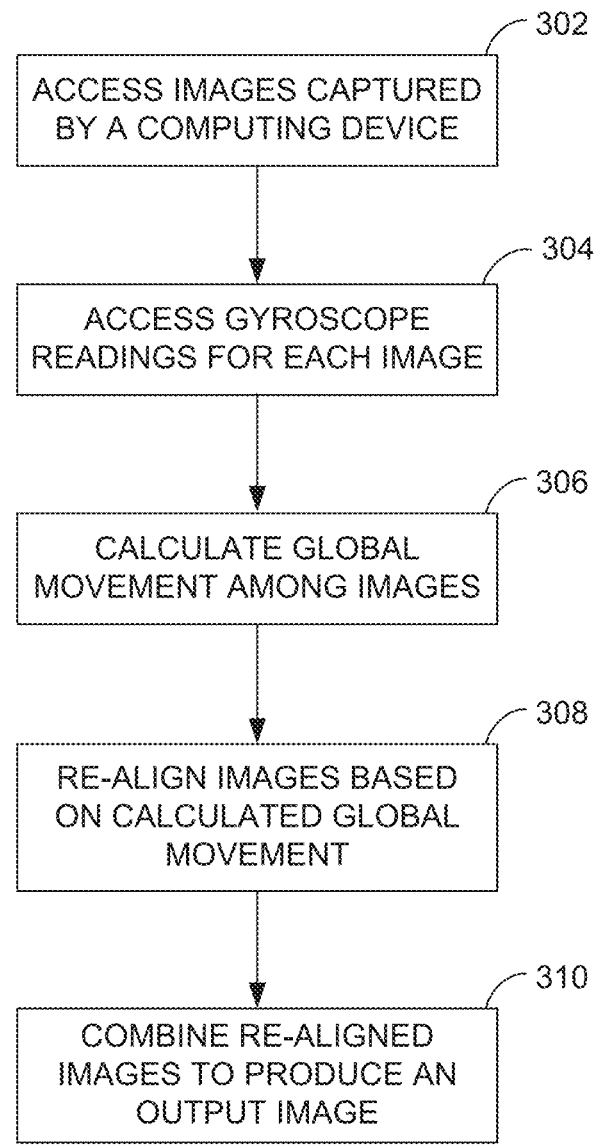
FIG. 3 is an exemplary flow chart illustrating operation of the computing device to produce an output image from accessed images while compensating for global movement in the accessed images.
Figure 4:
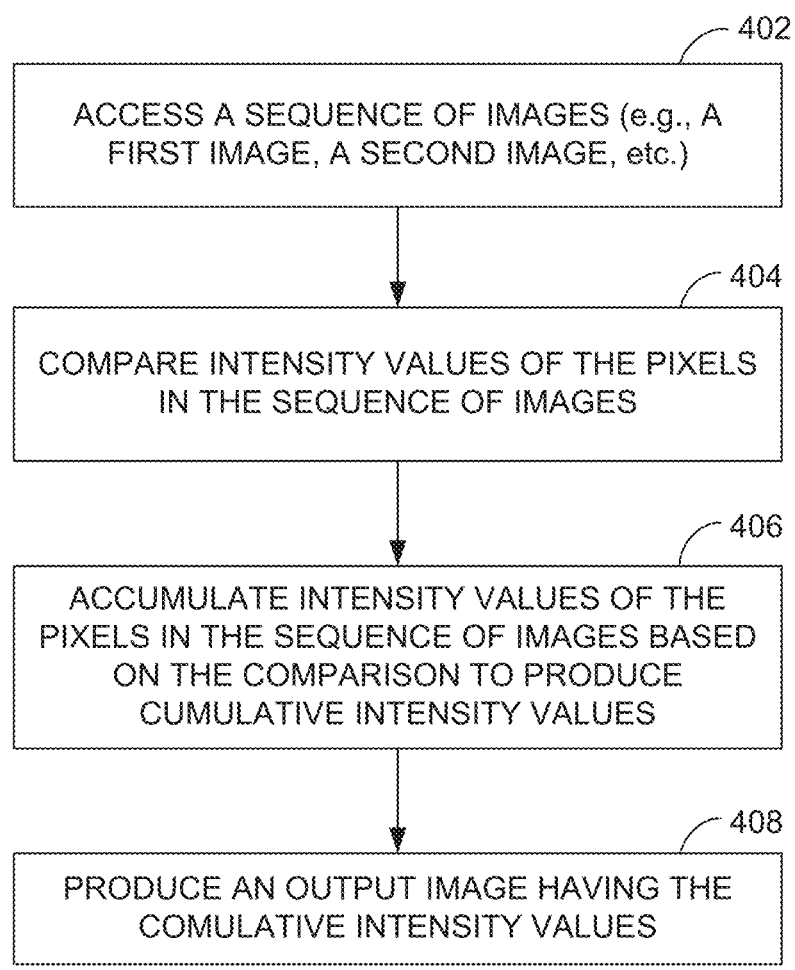
FIG. 4 is an exemplary flow chart illustrating operation of the computing device to produce an output image from accessed images by compensating for in-scene movement in the accessed images.

The processor 204 associated with the computing device 102 is programmed to execute instructions such as those illustrated in the figures (e.g., FIG. 3 and FIG. 4). In some embodiments, the processor 204 represents an implementation of analog techniques to perform the operations described herein. For example, the operations may be performed by an analog computing device and/or a digital computing device.

The computing device 102 further has one or more computer readable media such as the memory area 212. The memory area 212 includes any quantity of media associated with or accessible by the computing device 102. The memory area 212 may be internal to the computing device 102 (as shown in FIG. 2), external to the computing device 102 (not shown), or both (not shown). In some embodiments, the memory area 212 includes read-only memory and/or memory wired into an analog computing device.

The memory area 212 stores, among other data, a plurality of images 214 captured by the image sensor 206 of the computing device 102. The memory area 212 further stores the accelerometer readings 216 from the accelerometer 208. In some embodiments, each of the accelerometer readings 216 from the accelerometer 208 correspond to one of the plurality of images 214. The gyroscope readings 218 (e.g., rotational measurements) may be obtained from the gyroscope 210 and associated with each of the plurality of images 214. The gyroscope readings 218 are stored in the memory area 212.

The memory area 212 further stores one or more computer-executable components. Exemplary components include a memory component 220, a threshold component 222, a cumulative component 224, and a display component 226. Operation of the computer-executable components is described below with reference to FIG. 4.

The computing device 102 may additionally include a communications interface component (not shown) which includes a network interface card and/or computer-executable instructions (e.g., a driver) for operating the network interface card. Communication between the computing device 102 and the server computing device 106 may occur over the network 104 using any protocol. In some embodiments, the communications interface is operable with near-field communication (NFC) tags.

In an exemplary embodiment, the memory area 212 further stores only two frame buffers. The first one of the frame buffers stores each of the plurality of images 214 as each image 214 is captured in sequence. The second one of the frame buffers stores an intermediate image. For example, the first image may be stored in the first frame buffer as a reference image. The subsequent images 214 are processed as the subsequent images 214 are captured. Processing the subsequent images 214 includes performing the operations described in FIG. 3 and/or FIG. 4, where the intermediate image stored in the second frame buffer is updated as each image 214 is processed. The output image is produced from the final intermediate image, which reflects the cumulative intensity values for the processed images 214.

The operations next described with reference to FIG. 3 and FIG. 4 compare the images 214 from a sequence of the images 214. For example, each successive image 214 in the sequence may be compared with the immediately previous image 214 in the sequence, or compared to a reference image. In some embodiments, a first image in the sequence of images 214 represents the reference image for the other images 214 in the sequence of images 214. In another embodiment, the first image acts as the reference image for a second image, the second image acts as the reference image for a third image, etc. In still another embodiment, the first image acts as the reference image for the second image, the output image from processing the second image represents the reference image for the third image, etc.

Referring next to FIG. 3, an exemplary flow chart illustrates operation of the computing device 102 to produce an output image from accessed images 214 by compensating for global movement in the accessed images 214. While the operations illustrated in FIG. 3 are described as being performed by the computing device 102, aspects of the disclosure contemplate performance of the operations by entities other than the computing device 102, such as the server computing device 106.

Global movement includes, for example, handshake, jitter, and other movement or displacement affecting each of the in-scene objects similarly. At 302, a sequence of images 214 captured by the computing device 102 is accessed. For example, the computing device 102 captures 30 images 214 in a second as a burst, including a first image, a second image, etc. Each of the images 214 includes a plurality of pixels (e.g., dependent on the image sensor 206). In other embodiments, the computing device 102 accesses a previously captured sequence of images 214 for processing. In some embodiments, the burst of images 214 represents a series of frames from a video file.

While some embodiments describe the image sensor 206 as operating at 30 frames per second (fps), the image sensor 206 may operate at other frame rates higher or lower than 30 fps. Further, each pixel in the image sensor 206 may be reset after each of the plurality of images 214 is captured to obtain discrete readings from the same pixel multiple times, in some embodiments. Resetting each pixel may be performed by opening and closing a shutter of the computing device 102 with each frame capture. In other embodiments, each pixel is reset only after the plurality of images 214 has been captured.

In some embodiments, a longer exposure while capturing each image 214 results in a high signal-to-noise ratio (SNR), which correlates to an overall improvement in image quality. The sum of the exposure time of individual frames is equivalent to an effective exposure time. In a particular example, the SNR of the output image is increased by the square root of the total number of frames compared with the SNR of each individual frame.

At 304, the gyroscope readings 218 for each image 214 are accessed. For example, the gyroscope readings 218 for each image 214 are obtained as each image 214 is captured. The gyroscope readings 218 describe rotational motion of the image sensor 206. Alternatively or in addition to the gyroscope readings 218, the accelerometer readings 216 may be accessed at 304. The accelerometer readings 216 describe linear motion of the image sensor 206 (e.g., linear measurement, displacement, etc.).

At 306, global movement among each of the accessed images 214 is calculated based on the accessed accelerometer readings 216 and/or the gyroscope readings 218. For example, the accessed images 214 represent a plurality of images 214 captured in sequence, with one of the plurality of images 214 being designated a reference image. Any of the images 214 may be designated as a reference image in accordance with any of the known algorithms for selecting reference images from a burst of images 214.

In some embodiments, calculating the global movement includes calculating pixel offset between each of the plurality of images 214 and the reference image. The calculated pixel offset includes a two-dimensional pixel shift, with accounting for rotation of the computing device 102 or the image sensor 206 in some embodiments. For example, the calculated global movement from a first image to a second image may indicate that each pixel in the first image was shifted up one pixel position and over three pixel positions to the right in the second image. Pixel shift is also calculated between the second image and a third image, the third image and a fourth image, etc. In other embodiments, each of the subsequent images 214 are compared to only the reference image (e.g., the first image) when determining pixel shift. For example, the second image is compared to the reference image, the third image is compared to the reference image, the fourth image is compared to the reference image, etc. Aspects of the disclosure are operable with any algorithm for comparing two images 214 to determine global movement or shift. An example algorithm compares pixel intensity values of the first image with corresponding pixel intensity values of the second image in an attempt to determine an (x,y) offset that occurs from the first image to the second image.

At 308, each of the accessed images 214 is re-aligned based on the calculated global movement. The re-alignment of each of the accessed images 214 includes adjusting pixel locations or positions (e.g., counterbalancing) in each of the plurality of images 214 based on the calculated pixel offset for that image 214. For example, the position of each pixel in a second image is adjusted based on the calculated pixel shift or offset that occurred relative to a corresponding pixel in the first image. In some embodiments, adjusting the pixel locations includes adjusting memory addresses of the pixel intensity values associated with the pixels in the plurality of images 214. For example, each of the pixels is re-indexed by adjusting the memory location or address of each pixel in the memory area 212 to allow readout from that memory location.

In this manner, the computing device 102 compensates for positional movement of the image sensor 206 during image capture. In embodiments in which the gyroscope readings 218 are factored into the calculated global movement and re-alignment, the computing device 102 further compensates for angular movement of the image sensor 206 during image capture.

At least the calculation of the global movement and the re-alignment of the accessed images 214 occur without operating mechanical parts associated with the image sensor 206, in some embodiments.

After re-aligning each of the accessed images 214, the re-aligned accessed images 214 are combined to produce a single output image at 310. Combining the re-aligned accessed images 214 includes, for example, combining the pixel intensity values from corresponding pixels from each of the re-aligned accessed images 214 to produce pixel intensity values for association with the single output image. However, aspects of the disclosure are operable with any algorithm for combining images 214. As an example, the corresponding pixel intensity values at each of the pixel positions in each of the images 214 may be weighted and then summed.

Referring next to FIG. 4, an exemplary flow chart illustrates operation of the computing device 102 to produce the output image from accessed images 214 by compensating for in-scene movement in the accessed images 214. While the operations illustrated in FIG. 4 are described as being performed by the computing device 102, aspects of the disclosure contemplate performance of the operations by entities other than the computing device 102, such as the server computing device 106.

At 402, a sequence of images 214 is accessed. Accessing the images 214 is described above with reference to FIG. 3. In the example of FIG. 4, the sequence of images 214 includes at least a first image and a second image. At 404, the intensity values of the corresponding pixels in the sequence of images 214 are compared. For example, the intensity values of pixels in the first image are compared with the intensity values of corresponding pixels in the second image.

In some embodiments, the intensity values associated with the pixels in the second image are compared to expected intensity values for the pixels. The expected intensity values are derived from the first image (or other reference image). For example, in a sequence of the images 214, the expected intensity value for each of the pixels is defined to be the intensity value for the pixel from the first image or other selected reference image.

At 406, the intensity values of the pixels in the sequence of images 214 are selectively accumulated based on the comparison at 404 to produce cumulative intensity values. For example, and as described further below with reference to FIG. 7, the intensity value that differs substantially (e.g., beyond a threshold or other criteria) from the corresponding expected intensity value is discarded, whereas the intensity value that is approximately, substantially, or otherwise about the same as the corresponding expected intensity value is added to the cumulative intensity value for that pixel.

After generating the cumulative intensity values for each of the pixels, the computing device 102 produces an output image at 408.

In some embodiments, the computing device 102 executes the components illustrated in FIG. 2 to implement the operations illustrated and described with reference to FIG. 4. For example, the memory component 220, when executed by the processor 204, causes the processor 204 to access the first image and the second image in the sequence of images 214 captured by the computing device 102.

The threshold component 222, when executed by the processor 204, causes the processor 204 to compare intensity values associated with pixels in the first image to the intensity values associated with the corresponding pixels in the second image. The threshold component 222, for example, can be the value of one root mean square (RMS) of the estimated noise from the reference image at each pixel.

The cumulative component 224, when executed by the processor 204, causes the processor 204 to selectively accumulate the intensity values associated with the pixels in the first image with the intensity values associated with the corresponding pixels in the second image based on the comparison performed by the threshold component 222, thus producing the cumulative intensity values. For example, the cumulative component 224 discards the intensity values, associated with the pixels in the second image, that fall outside the defined range of expected intensity values. The cumulative component 224 adds the intensity values associated with the pixels in the second image to the intensity values associated with the corresponding pixels in the first image, if the intensity values from the second image are within the defined range of expected intensity values.

The display component 226, when executed by the processor 204, causes the processor 204 to produce the output image using the cumulative intensity values.

In an exemplary embodiment, the first image represents the reference image, and the sequence of images 214 includes a third image. The threshold component 222 further compares the intensity values associated with the pixels in the third image to the intensity values associated with the corresponding pixels in the reference image. The cumulative component 224 further selectively adds the intensity values associated with the pixels in the third image to the cumulative intensity values (e.g., produced from the first image and the second image) based on the comparison, by the threshold component 222, of the intensity values associated with the pixels in the third image to the intensity values associated with the corresponding pixels in the reference image.

The threshold component 222 may further define a range of expected intensity values for each of the pixels in the second image based on the intensity values associated with the pixels in the reference image. The threshold component 222 compares the intensity values associated with the pixels in the first image to the intensity values associated with the corresponding pixels in the second image by comparing the intensity values associated with the pixels in the second image to the defined range of expected intensity values for those pixels.

Figure 5:
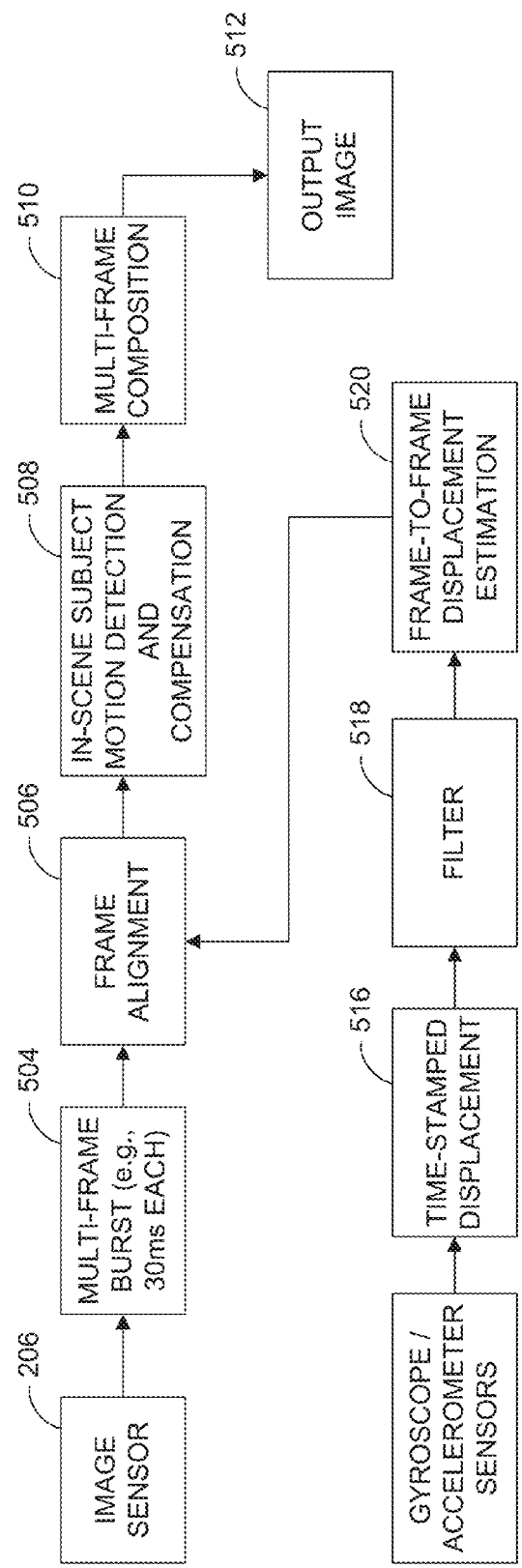
FIG. 5 is an exemplary block diagram illustrating generation of an output image after compensating for global movement and in-scene movement.
Figure 6:
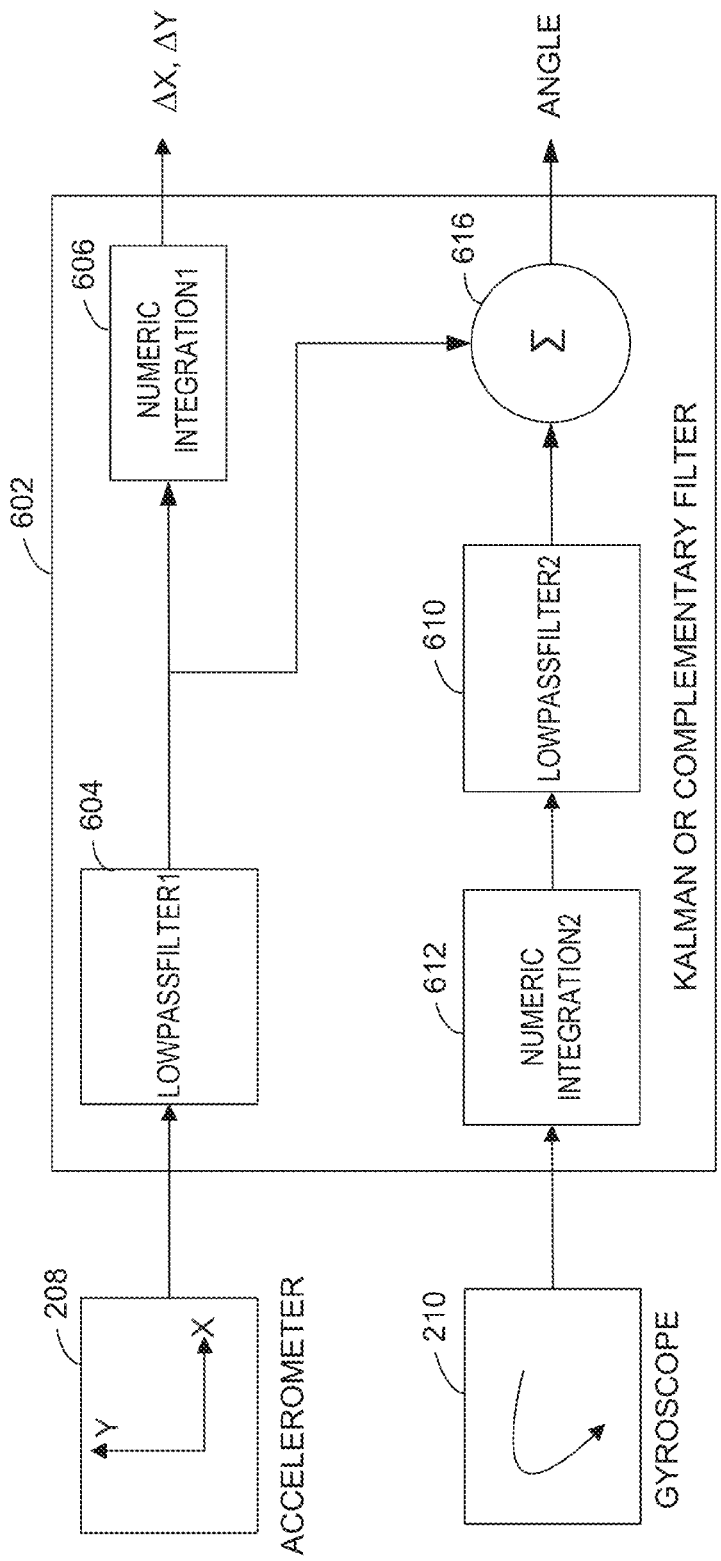
FIG. 6 is an exemplary block diagram illustrating filter operations for estimating image displacement.

Referring next to FIG. 5, an exemplary block diagram illustrates generation of an output image 512 after compensating for global movement and in-scene movement. For example, the image sensor 206 produces a sequence of images 214 (e.g., a multi-frame burst 504 at 30 milliseconds each). The gyroscope 210 and/or accelerometer 208 sensors produce time-stamped displacement 516 data. A filter 518 estimates frame-to-frame displacement 520. An example of the filter 518 includes, for example, a Kalman filter or complementary filter 602 as shown in FIG. 6. However, other types of the filters 518 may be used for estimating inter-frame displacement. Frame alignment 506 takes the multi-frame burst 504 and the frame-to-frame displacement 520 as inputs. In-scene subject motion detection and compensation 508 is then performed, followed by a multi-frame composition 510. The multi-frame composition 510 accumulates the intensity values of corresponding pixels in the different frames after the in-scene subject motion detection and compensation 508. The multi-frame composition 510 produces the output image 512.

Referring next to FIG. 6, an exemplary block diagram illustrates the Kalman or complementary filter 602 for estimating intra-image and/or intra-frame displacement based on data from the accelerometer 208 and/or the gyroscope 210. The example of FIG. 6 compares two frames. The accelerometer readings 216 pass through a LowPassFilter1 604. Calculations associated with NumericIntegration1 606 are performed on the filtered accelerometer readings 216 to calculate the difference in the accelerometer readings 216 between the two frames in the sequence of images 214. The calculated difference in the accelerometer readings 216 is represented as $\Delta X$, $\Delta Y$.

Calculations associated with NumericIntegration2 612 are performed on the gyroscope readings 218, which are then passed through a LowPassFilter2 610. A summation 616 calculates or otherwise determines the global movement using the formula shown below in Equation (1) using output from the LowPassFilter1 604 and the LowPassFilter2 610.

$$\text{Angle}=(\text{value1})*(\text{Angle}+\text{gyroscope}*dt)+(\text{value2})*(\text{Accelerometer}) \quad (1)$$

In Equation (1) above, value1 and value2 represent weighting constants, dt represents the time incremental of each gyroscope reading, gyroscope represents the gyroscope reading value at each time incremental, and Accelerometer represents the accelerometer reading. In an exemplary embodiment, the value of constant value1 is 0.98 and the value of constant value2 is 0.02. The values of value1 and value2 are configurable, and may be changed (e.g., by the user of the computing device 102).

The gyroscope readings 218, if calculated over a short duration of time dt, provide more accurate readings in some embodiments because the gyroscope 210 may drift over time. The short duration of time dt represents the operation frequency of the gyroscope.

Aspects of the disclosure are not limited to the Kalman filter or complementary filter 602. Rather, any filter may be used for calculating the global movement among the images 214 based on the accelerometer readings 216 and/or gyroscope readings 218. Further, use of multiple accelerometers 208 and/or multiple gyroscopes 210 is within scope of the present disclosure. For example, three gyroscopes 210 and three accelerometers 208 may be used in the computing device 102 to calculate angles in three dimensions.

Figure 7:
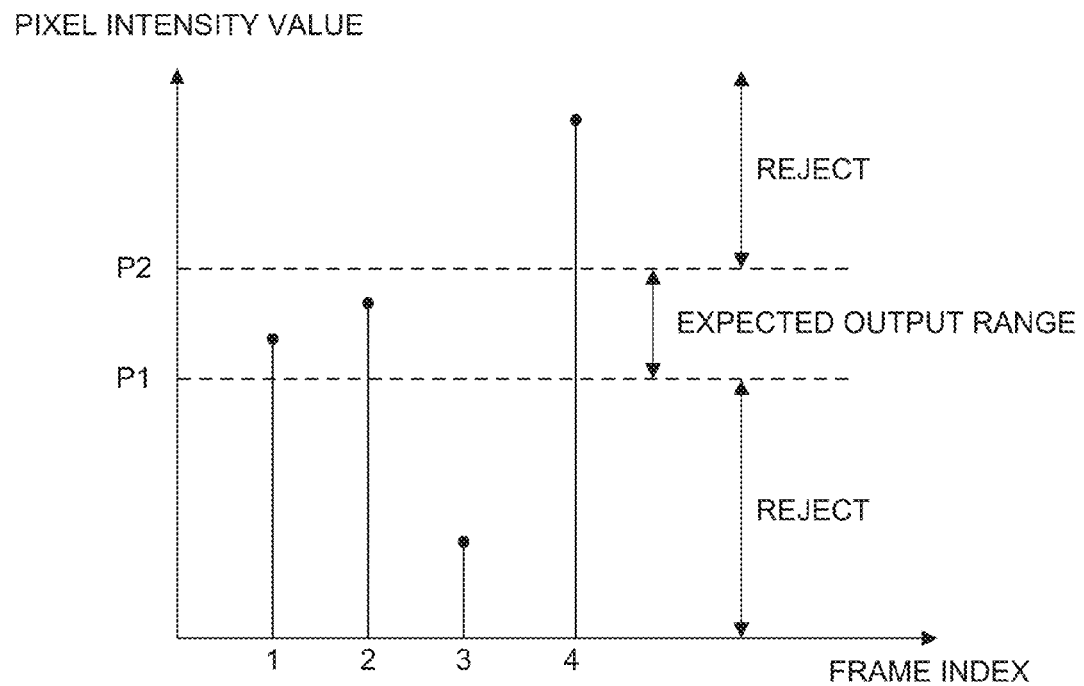
FIG. 7 is an exemplary graph illustrating the selective accumulation of pixel intensity values within an expected output range by rejecting pixel intensity values outside the expected output range.

Referring next to FIG. 7, an exemplary graph illustrates the selective accumulation of pixel intensity values within an expected output range by rejecting pixel intensity values outside the expected output range. For example, the intensity values for a pixel in Frame 1 and Frame 2 are within the expected output range (e.g., P1 to P2), whereas the intensity values for the corresponding pixel in Frame 3 and Frame 4 are outside the expected output range (e.g., below and above, respectively). The pixels in the frames whose intensity value is outside the expected output range are rejected, and the pixels in the frames whose intensity value is within the expected output range are accumulated into the cumulative intensity values for use in producing a single output image.

While the expected output range is based on intensity values from a reference image, the size of the expected output range is configurable and may be predetermined. For example, P1 and P2 may represent 10% above an intensity value and 10% below the intensity value, respectively. If an intensity value falls outside that range, then in-scene movement is occurring and the intensity value is discarded to compensate for the in-scene movement. Conversely, if an intensity value falls within the range, then any in-scene movement is minimal and the intensity value is added to the cumulative intensity value for that pixel. Alternatively or in addition, the size of the expected output range may be defined by the manufacturer, by the user of the computing device 102, or other entity.

Figure 8:
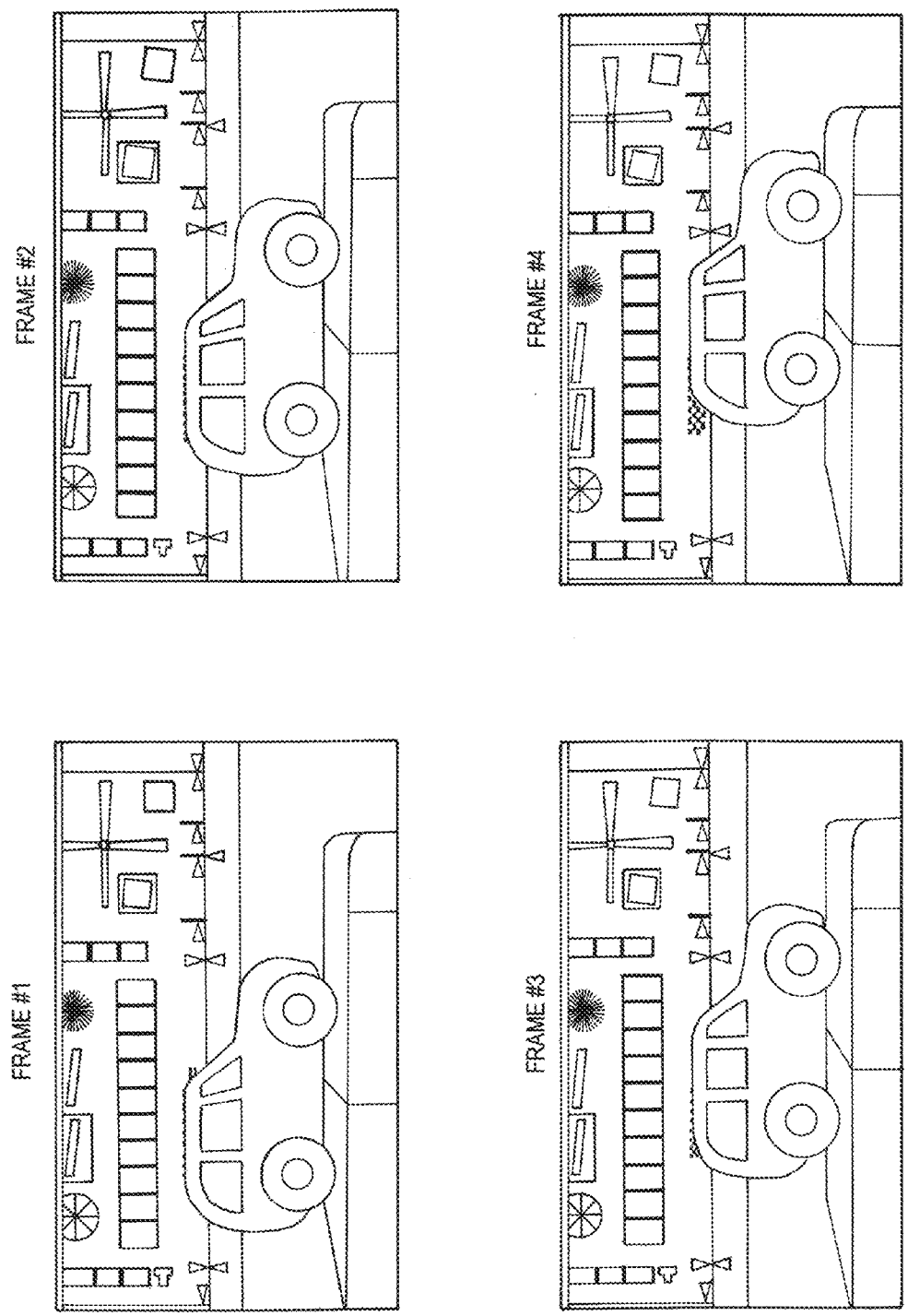
FIG. 8 is an exemplary illustration of a sequence of four frames captured by the computing device.
Figure 9A:
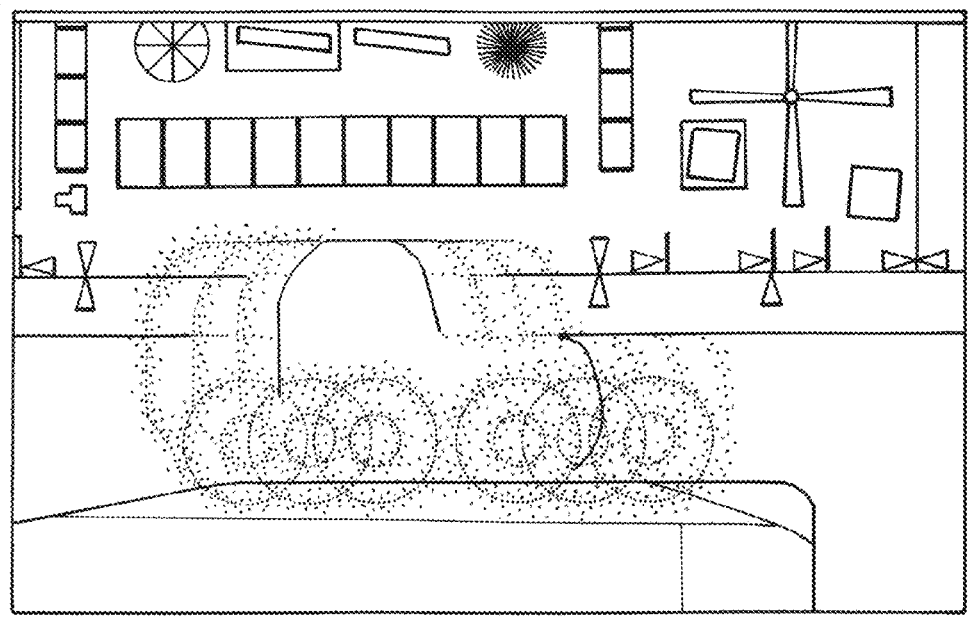
FIG. 9A is an exemplary illustration of a cumulative frame produced from the sequence of four frames shown in FIG. 8, without processing.

Referring next to FIG. 8, a sequence of four frames captured by the computing device 102 is shown. The four frames represent a burst of images during which in-scene movement has occurred. Referring next to FIG. 9A, a cumulative frame is produced, without processing, from the sequence of four frames from FIG. 8. The cumulative frame in FIG. 9A is blurred due to the in-scene movement (e.g., movement of the car relative to the platform in the frames).

Figure 9B:
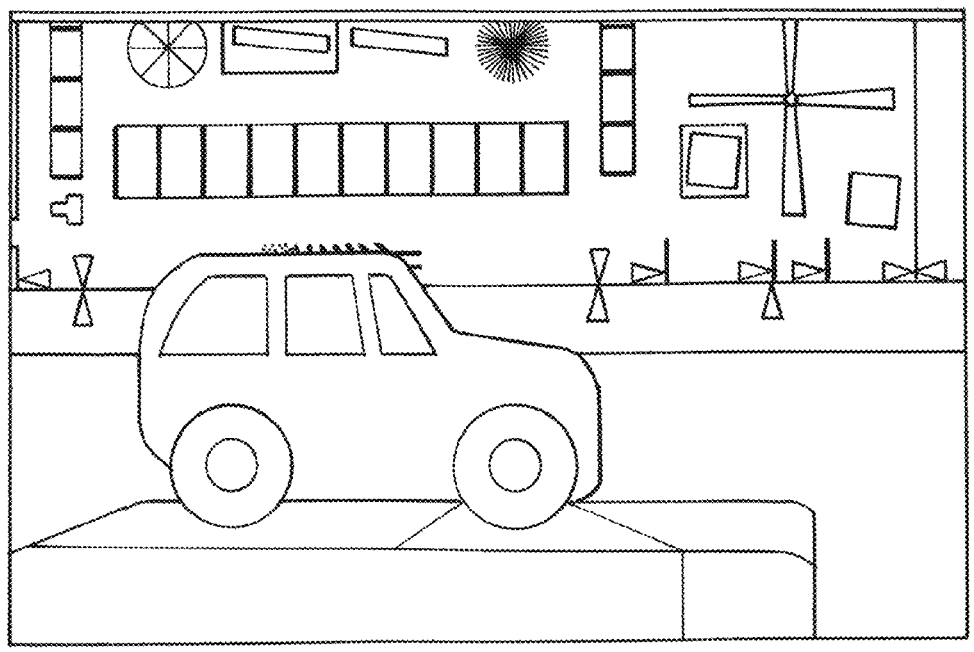
FIG. 9B is an exemplary illustration of a cumulative frame produced from the sequence of four frames shown in FIG. 8, after compensating for in-scene movement.

In contrast, referring next to FIG. 9B, a cumulative frame is produced from the sequence of four frames from FIG. 8 after compensating for in-scene movement (e.g., performing the operations illustrated in at least FIG. 4, and possibly FIG. 3). The cumulative frame in FIG. 9B is notably more clear than the cumulative frame in FIG. 9A, indicating that the operations from at least FIG. 4 (and possibly FIG. 3) have effectively compensated for the in-scene movement.

Figure 10A:
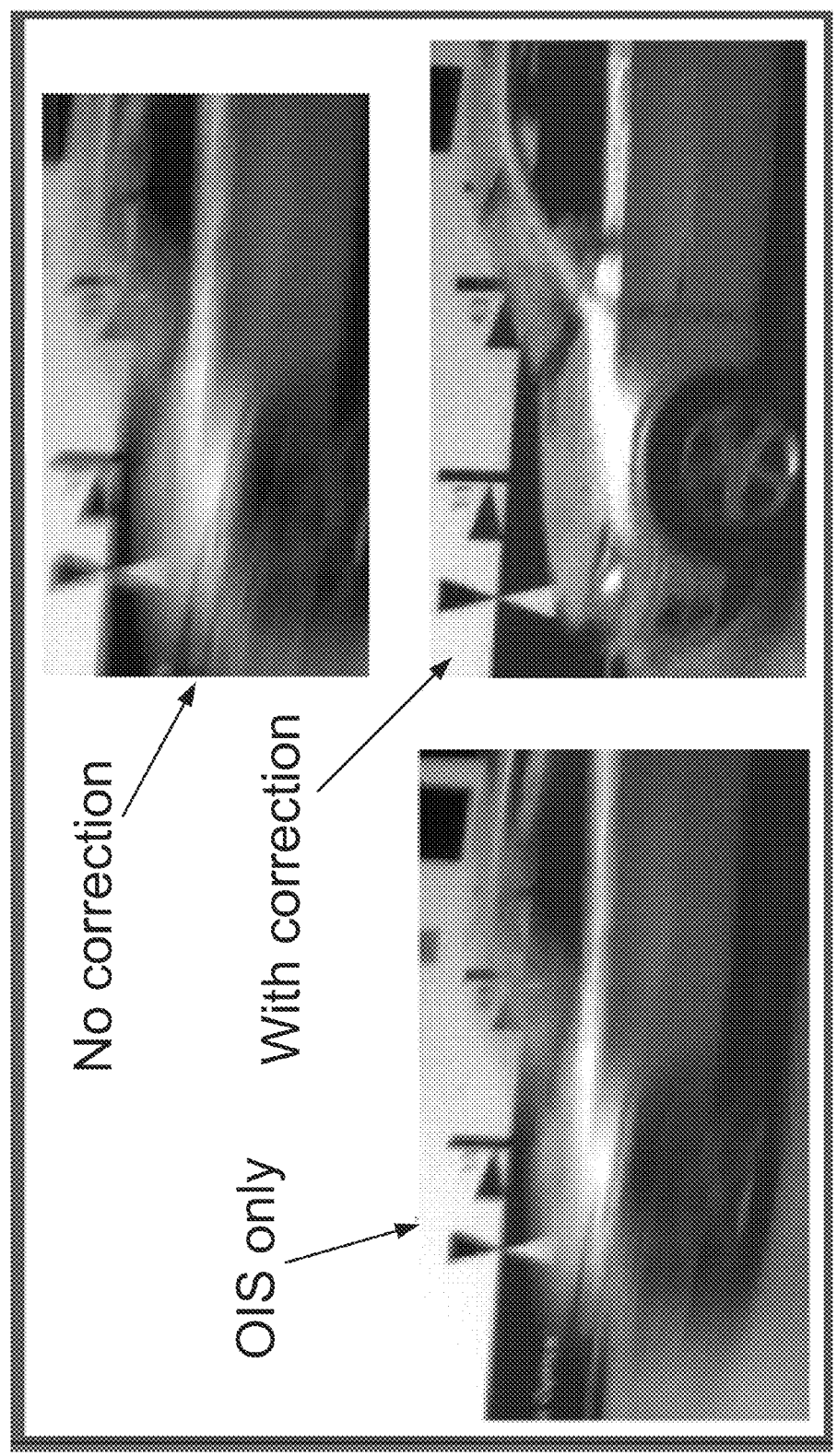
FIG. 10A is an exemplary illustration of a sample output image with "No correction", a sample output image with optical image stabilization (OIS), and a sample output image after processing using the operations illustrated in FIG. 3 and/or FIG. 4.

Referring next to FIG. 10A, three sample output images (e.g., cumulative images) are reproduced. In particular, the three output images include a sample output image ("No correction) that has not been processed to compensate for global movement or in-scene movement, a sample output image processed with optical image stabilization (OIS) only, and a sample output image ("With correction") after processing using the operations illustrated in FIG. 3 and FIG. 4. Examination of the "No correction" image reveals that both global movement and in-scene movement occurred during the burst of frames. Notably, both the background and the automobile are very blurry. Examination of the "OIS only" image reveals that there has been some attempt at compensating for global movement as the background is somewhat less blurry, but the automobile in the image remains very blurry.

In contrast, examination of the "With correction" image reveals that there has been compensation for both global movement and in-scene movement. Notably, both the background and the automobile are fairly blur-free relative to the other two images. As such, these images illustrate how aspects of the disclosure provide effective compensation for both global movement and in-scene movement.

Figure 10B:
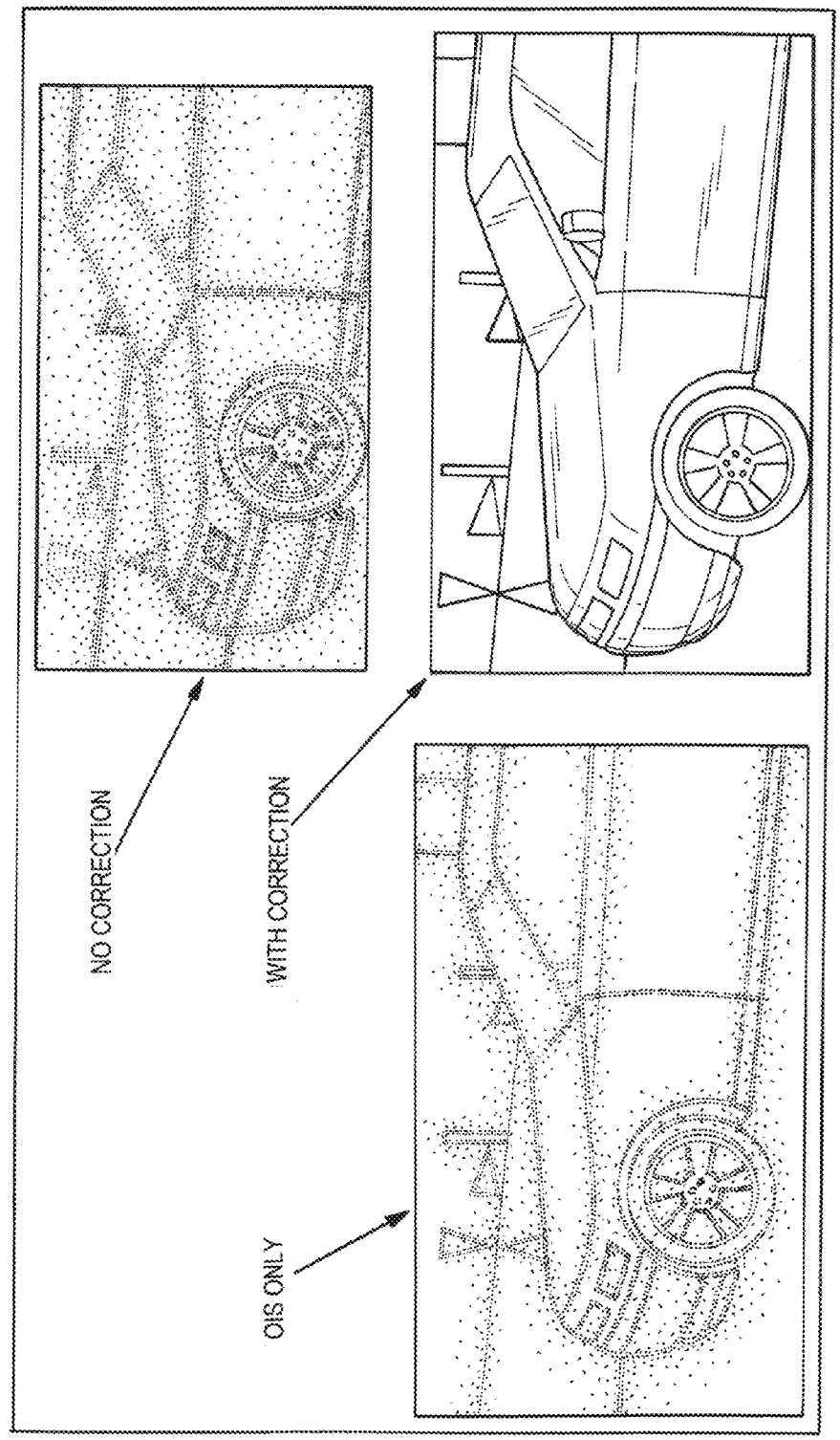
FIG. 10B illustrates a re-drawn version of the sample output images from FIG. 10A.

FIG. 10B illustrates a re-drawn version of the sample output images from FIG. 10A.

ADDITIONAL EXAMPLES

In some embodiments, a plurality of superpixels may be defined. Each of the plurality of superpixels corresponds to a predefined number of pixels derived from the plurality of pixels from one or more of the images 214. An exemplary superpixel may correspond to a 2×2 array of the pixels. In such embodiments, the operations illustrated and described with reference to FIG. 3 and FIG. 4 are performed on the defined superpixels. For example, calculating the global movement among the accessed images 214 based on the gyroscope readings 218, re-aligning each of the accessed images 214 based on the calculated global movement, and combining the re-aligned accessed images 214 into the single output image, operate on the defined superpixels.

Some aspects of the disclosure contemplate the pixel intensity values accumulating up to predefined threshold values to prevent saturation. The predefined threshold values may be defined based on the pixels in the reference image (e.g., for each pixel, a percentage above or below the intensity value for that pixel). In some embodiments, the predefined threshold value for each of the pixels is defined based on display capabilities of the computing device 102 on which the output image is intended to be displayed.

The computing device 102 may be mounted on a tripod or other physical stabilization device. In such embodiments, aspects of the disclosure only compensate for in-scene subject motion because global movement has been eliminated or reduced below a threshold. In other embodiments, the computing device 102 only compensates for global movement when in-scene movement is eliminated (e.g., capturing images of a landmark, monument, or other fixed object).

At least a portion of the functionality of the various elements in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for compensating for motion and saturation when capturing the plurality of images 214.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for compensating for in-scene and camera motion during image capture by a mobile computing device, said system comprising:
    an image sensor;
    a gyroscope for providing rotational motion data of the image sensor;
    an accelerometer for providing linear motion data of the image sensor;
    a memory area storing a plurality of images captured by the image sensor, the memory area further storing readings from the gyroscope and the accelerometer, the readings corresponding to each of the plurality of images; and
    a processor programmed to:
        calculate global movement among the plurality of images based on the readings, the global movement comprising the rotational motion data and the linear motion data;
        re-align each of the plurality of images based on the calculated global movement;
        compare intensity values associated with pixels in the re-aligned images to corresponding expected intensity values for the pixels, the corresponding expected intensity values being derived from a reference image in the plurality of images;
        selectively accumulate the intensity values associated with the pixels in the re-aligned images based on the comparison, the selective accumulating comprising, for each pixel in the re-aligned images, discarding an intensity value that is above a first threshold or below a second threshold, the first threshold and the second threshold being different from each other, otherwise adding the intensity value to the corresponding expected intensity value and producing a cumulative intensity value for that pixel; and
        generate an output image using the selectively accumulated intensity values.

2. The system of claim 1, wherein calculating the global movement among the plurality of images comprises applying a filter on the readings to calculate the global movement among the plurality of images.

3. The system of claim 1, wherein the memory area further stores two frame buffers, wherein a first one of the frame buffers stores each one of the plurality of images as the plurality of images are captured in sequence, and wherein a second one of the frame buffers stores the reference image.

4. The system of claim 1, wherein the selective accumulating further comprises accumulating intensity values associated with the pixels in the re-aligned images falling within a range of intensity values associated with pixels in the reference image and discarding the intensity values associated with the pixels in the re-aligned images falling outside the range of intensity values associated with the pixels in the reference image, the range being between the first threshold and the second threshold.

5. The system of claim 1, wherein the processor is further programmed to capture the plurality of images from the image sensor in sequence and obtain the readings from the gyroscope and the accelerometer simultaneously therewith.

6. The system of claim 1, wherein the first threshold and the second threshold are configurable.

7. A method for compensating for in-scene and camera motion during image capture, the method comprising:
    accessing images captured by a computing device;
    accessing readings from a gyroscope and one or more accelerometers associated with the computing device, each of the readings corresponding to at least one of the accessed images;
    calculating global movement among each of the accessed images based on the accessed readings, calculating global movement including calculating linear movements via readings from the one or more accelerometers and calculating rotational movements via readings from the gyroscope;
    re-aligning each of the accessed images based on the calculated global movement;
    comparing intensity values associated with pixels in the re-aligned accessed images to corresponding expected intensity values for the pixels, the corresponding expected intensity values being derived from a reference image selected from the accessed images;
    selectively accumulating the intensity values associated with the pixels in the re-aligned accessed images based on the comparison, the selective accumulating comprising, for each pixel in the re-aligned accessed images, discarding an intensity value that is above a first threshold or below a second threshold, the first threshold and the second threshold being different from each other, otherwise adding the intensity value to the corresponding expected intensity value and producing a cumulative intensity value for that pixel; and
    combining the re-aligned accessed images into a single output image.

8. The method of claim 7, wherein combining the re-aligned accessed images comprises combining intensity values from corresponding pixels from each of the re-aligned accessed images to produce intensity values associated with the single output image, while preventing saturation of the single output image.

9. The method of claim 7, wherein the accessed images each include a plurality of pixels, the method further comprising defining a plurality of superpixels each corresponding to a predefined number of pixels derived from the plurality of pixels in each of the accessed images, and wherein said calculating, said re-aligning, and said combining operate on the defined superpixels.

10. The method of claim 7, wherein said calculating and said re-aligning occur without operating mechanical parts within the computing device.

11. The method of claim 7, wherein accessing the images comprises accessing a plurality of images in sequence with one of the plurality of images representing the reference image.

12. The method of claim 11, wherein calculating the global movement comprises calculating pixel offset between each of the plurality of images and the reference image, the calculated pixel offset including a two-dimensional pixel shift with accounting for rotation of the computing device.

13. The method of claim 12, wherein re-aligning each of the accessed images comprises adjusting pixel locations in each of the plurality of images based on the calculated pixel offset for that image.

14. The method of claim 7, wherein the first threshold and the second threshold are configurable.

15. One or more computer memories embodying computer-executable components, said components comprising:
   a memory component that when executed causes at least one processor to access a first image and a second image from a sequence of images captured by a computing device;
   a threshold component that when executed causes at least one processor to compare intensity values associated with pixels in the second image to intensity values associated with corresponding pixels in the first image;
   a cumulative component that when executed causes at least one processor to compensate for at least one of subject movement or movement of the computing device by selectively accumulating the intensity values associated with the pixels in the first image with the intensity values associated with the corresponding pixels in the second image based on the comparison performed by the threshold component to produce cumulative intensity values, the selective accumulating comprising, for each pixel in the second image, discarding an intensity value that is above a first threshold or below a second threshold, the first threshold and the second threshold being different from each other, otherwise adding the intensity value to corresponding intensity value in the first image and producing a cumulative intensity value for that pixel; and
   a display component that when executed causes at least one processor to produce an output image having the selectively accumulated intensity values.

16. The computer memories of claim 15, wherein the first image represents a reference image, wherein the sequence of images further includes a third image, wherein the threshold component further compares intensity values associated with pixels in the third image to the intensity values associated with corresponding pixels in the reference image, and wherein the cumulative component further selectively adds the intensity values associated with the pixels in the third image to the cumulative intensity values based on the comparison.

17. The computer memories of claim 15, wherein the first image represents a reference image, wherein the threshold component further defines a range of expected intensity values for each of the pixels in the second image based on the intensity values associated with the pixels in the reference image.

18. The computer memories of claim 17, wherein the threshold component compares the intensity values associated with the pixels in the first image to the intensity values associated with the corresponding pixels in the second image by comparing the intensity values associated with the pixels in the second image to the defined range of expected intensity values for each of the pixels in the second image.

19. The computer memories of claim 18, wherein the cumulative component selectively accumulates the intensity values associated with the pixels in the first image with the intensity values associated with the corresponding pixels in the second image by discarding the intensity values associated with those pixels in the second image whose intensity values fall outside the defined range of expected intensity values.

20. The computer memories of claim 18, wherein the cumulative component selectively accumulates the intensity values associated with the pixels in the first image with the intensity values associated with the corresponding pixels in the second image by adding the intensity values associated with the pixels in the first image with those corresponding pixels in the second image whose intensity values are within the defined range of expected intensity values to produce the cumulative intensity values.

* * * * *